United States Patent Office 3,205,285
Patented Sept. 7, 1965

3,205,285
SULFONATION OF AN OLEFIN POLYMER
Albin F. Turbak, New Providence, Allen Noshay, Fords, and Gabriel Karoly, Elizabeth, N.J., assignors to Esso Research and Engineering Company, a corporation of Delaware
No Drawing. Filed Jan. 19, 1961, Ser. No. 83,621
6 Claims. (Cl. 260—89.7)

This invention relates to the sulfonation of alpha olefin polymers and, more particularly, to a process for sulfonating such polymers to render them receptive to dyes.

It has been known for some time that fibers formed from alpha olefin polymers and copolymers such as polypropylene, polypropylene-polyethylene, etc. would be useful as textile materials if a satisfactory method could be obtained for dyeing the fibers. However, because of lack of acceptor groups in these polymers, previous attempts to dye the fibers have resulted in very little, if any, dye retention.

It has now been discovered that when an alpha olefin polymer or copolymer is treated with a mixture of an alkyl phosphate and sulfur trioxide in a suitable diluent, a sulfonated polymer is obtained which can be satisfactorily dyed. With the use of basic and dispersed dyes, dark shades can be obtained which are fast to boiling detergents, dry cleaning solvents, and which do not crock. It was found that the ratio of $SO_3$ to alkyl phosphate must be held below 2.7/1, or substantial degradation of the polymer occurs. It was also discovered that when other sulfonating agents were employed such as concentrated fuming sulfuric acid or chlorosulfonic acid, the polymers underwent substantial degradation.

The process of the invention is carried out by treating a suitable alpha olefin polymer or copolymer in a solution of a diluent containing $SO_3$ and alkyl phosphate and a mole ratio of $SO_3$/alkyl phosphate below 2.7/1, preferably in the range of 2.0/1 to 2.4/1 at a temperature of 30° C. to 110° C., preferably 30–50° C. for aromatic containing copolymers and blends and 80–110° C. for branched homopolymers for a period of time 5 sec. to 1.5 hrs. The time is not critical and will depend on such factors as the temperature and the number of sulfonate groups desired to be introduced into the polymer. Suitable diluents for the process include the alkyl phosphate itself; paraffinic, cycloparaffinic and holgenated aliphatic hydrocarbons having a boiling point above 70° C., such as n-hexane, dichloroethane, and cyclohexane. Mixtures of the above diluents can advantageously be employed.

In general, the concentration of the $SO_3$ in the solution is maintained in the range of 4 to 12%, preferably 4 to 6%.

The alkyl phosphate components of the sulfonating compositions can be trisubstituted phosphate such as trialkyl phosphates having from 1 to 18 carbon atoms per alkyl group. The alkyl groups of the trialkyl phosphates can be the same or different; for example, methyl ethyl mixed phosphate, methyl ethyl propyl phosphate, triethyl phosphate, and the like, with symmetrical trialkyl phosphates being preferred.

The polymers treated by the process of the invention are alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, polybutene-1, and polyheptene-1. Polymers of branched chain alpha olefins where the branching occurs no closer than the 4th carbon atom can also be employed such as poly-4-methyl-1-heptene. In general, the homopolymers are prepared from alpha olefins having from 2 to 12 carbon atoms. The copolymers employed in the process of the invention include copolymers of two different alpha olefins such as ethylene-propylene copolymers. Ethylene-1-hexene copolymers; and alpha olefin-aromatic olefin copolymers containing from 1 to 15% by wt. of an aromatic olefin, such as for example propylene-styrene copolymers. Also, blends of one or more of the previously mentioned polymers can be employed. The polymers and copolymers employed in the invention have molecular weights ranging from 100,000 to 1,000,000. The preferred polymers and copolymers of the invention are those prepared by the so-called Ziegler process. Catalysts which are useful in this process are mixtures of reducible transition heavy metal compounds and reducing metal containing substances, or mixtures of partially reduced transition heavy metal compounds and organo metallic activators. Examples of these catalysts are $TiCl_4+AlEt_3$ and $TiCl_3+AlEt_3$. The catalysts used for preparing the preferred polymers employed in the instant process are those catalysts given on page 6, line 20 to page 10, line 21 of copending application Serial No. 831,210, filed August 3, 1959.

The sulfonated polymers of the invention contain from 0.1 to 5% by wt., preferably 0.2 to 0.7 wt. percent of sulfur in the form of free sulfonic acid groups, sulfonic esters, or the corresponding metal salts of the sulfonic acid groups. The process of the invention results in sulfonated polymers which, in addition to being readily dyable with basic and dispersed dyes, have little or no discoloration from the sulfonation step, little or no cross linking, and little or no degradation of the polymer chains.

The polymer is first drawn into fibers; the fibers are sulfonated and then treated with one or more dyes in aqueous media according to standard techniques known to the textile art.

In general the aqueous dye baths employed contain from 0.5 to 30 wt. percent dye. The temperature of dyeing and the time of immersion depends on the extent of sulfonation, the particular sulfonated polymer employed, the type and concentration of dye employed, the intensity of color desired, and the temperature of the dye bath. These parameters can easily be determined by routine experimentation for any particularly sulfonated polymer-dye combination. The temperature of dyeing is not critical and can range from 25 to 120° C. although the dye bath is usually maintained at the boiling point.

The dyes suitable for use to produce the colored polymers of the invention are those dyes containing basic groups or groups capable of combining with anionic sites or the salts of such sites. The classes of dyes that can be employed include dispersed dyes, SRA dyes, basic dyes, and Indigoid vats. After the polymer has been immersed in the dye bath for a suitable period of time, the polymer is removed, washed with water, scoured and dried.

The invention will be better understood from the following examples which are given merely for the purpose of illustrating the invention and are not meant to limit the invention.

EXAMPLE I

Propylene homopolymer having a molecular weight of 100,000–600,000 and prepared by a

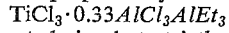

TiCl$_3$·0.33AlCl$_3$AlEt$_3$ catalyst, was reacted in hot triethyl phosphate solvent containing SO$_3$. Specifically, a bath was prepared at 15° C. by adding 12 cc. of SO$_3$ to 250 cc. of (EtO)$_3$PO. This bath was heated to 100° C. and a sample of polypropylene multifilament was immersed for a period of ½–2½ hours. The sample was removed, washed in water, and two portions thereof were dyed independently using aqueous solutions of 2.0% Genarryl Pink 3G-CF and 2.0% Sevron Blue 2G. Dark shades were obtained which were fast to boiling 5% detergent for 1 hour.

The sulfonated polypropylene is not degraded by the sulfonation step as evidenced by the following data:

|  | Original | Sulfonated with SO$_3$ Phosphate complex |
|---|---|---|
| Tensile Strength, g./den | 4.16 | 4.11 |
| Percent Elongation | 41.8 | 40.2 |
| Color | White | White |
| Percent S | 0 | 0.25 |

EXAMPLE II

Samples of the unsulfonated polypropylene used in Example I for the sulfonation step were dyed according to the process of Example I. When the polypropylene multi-filament was removed from the dye baths and washed, only faint shades of color remained which were removed almost completely by immersion in hot water for 10 minutes.

EXAMPLE III

Propylene was polymerized in xylene diluent with TiCl$_3$·0.33 AlCl$_3$-AlEt$_3$ catalyst at 80° C. with an Al/Ti ratio of 2/1. Styrene in xylene diluent was added during the course of polymerization. The product was precipitated and washed with methyl alcohol, and vacuum dried. The styrene content determined by Infra-Red analysis was 5 wt. percent. The polymer had 2800 p.s.i. tensile strength @ 1″/min., and a melt index of 1.9 @ 250° C.

*Sulfonation of samples of the above copolymer*

A

| 66% dichloroethane / 33% cyclohexane | cc | 100 |
|---|---|---|
| Triethyl phosphate | g | 5 |
| SO$_3$ (liquid) | cc | 3 |
| Copolymer | g | 2 |
| Temperature | ° C | 50 |
| Time | minutes | 20 |

After sulfonation, the product was washed and neutralized with 5% KOH solution (50% water, 50% isophopyl alcohol). Tensile strength after sulfonation and dyeing was 2600 p.s.i.

B

| Cyclohexane | cc | 50 |
|---|---|---|
| Dichloroethane | cc | 50 |
| SO$_3$ | cc | 3.0 |
| (EtO)$_3$PO | g | 5 |
| Copolymer | g | 2 |
| Time |  | 20 minutes |
| Temperature |  | 50° C. |
| Color after sulfonation |  | very slightly gray. |
| S |  | 0.56 wt. percent |

C

| Cyclohexane | cc | 20 |
|---|---|---|
| Dichloroethane | cc | 80 |
| SO$_3$ | cc | 3.0 |
| (EtO)$_3$PO | g | 5.0 |
| Polymer | g | 2.0 |
| Temperature |  | 50° C |
| Time |  | 20 Minutes |
| S |  | 0.37 wt. percent |
| Color |  | white |

The polymer was washed and neutralized as in Example A.

*Dyeing procedure*

The above sulfonate copolymers (A, B and C) were immersed in a 2 wt. percent solution of Gentian Violet boiled for 30 minutes, washed and dried. The dyed copolymers had a deep violet color which was fast to water, hot water, acetone, and hot sodium laurate solutions and perchlorethylene.

EXAMPLE IV

The copolymer of Example II was dyed according to the above dyeing procedure using the exact conditions employed with the sulfonated copolymers. The unsulfonated copolymer upon removal from the dye bath had only a pale violet color which was completely washed out when immersed in hot water for 10 minutes, leaving the copolymer with only a slight violet tinge.

EXAMPLE V

Perfectly linear polyethylene prepared from diazomethane was converted into film and sulfonated according to Example II, but at a much longer period of time (1½ hours). After the sample was removed from the sulfonation bath, it was washed with water, dried, and studied by infrared analyses. No sulfonation or any other change in the structure was noticed. Another sample was dyed with Sevron Blue 2G, but after washing with water, no dye retention was observed. From this evidence it has been concluded that sulfonation cannot be carried out in the absence of polymer branching.

EXAMPLE VI

In order to study the effect of the low degree of branching, a copolymer was prepared from ethylene and 1-butene, which had an average of 5 methyl groups per 1,000 carbon atoms by infrared analysis. A thin film was prepared from this copolymer and sulfonated and washed according to the method of Example V. One part of the sample was dyed with Sevron Blue 2G. Noticeable dye retention was observed even after consequent washing with water and dry cleaning solvents as perchloroethylene. Infrared analyses of the sample indicated the presence of sulfonic groups. From these data and those of Example V, it may be concluded sulfonation takes place at or on the branching of the chain.

It can be seen from the above examples that the sulfonated polymers and copolymers of the invention can successfully be dyed by basic dyes whereas the unsulfonated starting materials were almost completely unreceptive to the same dyes. Also, unbranched polymers are not reactive as illustrated by Example V.

Variations in the process of the invention can be carried out without departing from the scope and spirit of the invention.

What is claimed is:

1. The process for sulfonating an alpha olefin polymer comprising the steps of reacting an alpha olefin polymer in a hydrocarbon diluent with a mixture of an C$_1$–C$_{18}$ triangle phosphate and sulfur trioxide at a mole ratio of sulfur trioxide to trialkyl phosphate of below 2.7/1, and at a temperature in the range of 30° C. to 110° C. for a time sufficient to produce a sulfonated polymer having from 0.1 to 5 wt. percent sulfur therein.

2. The process of claim 1 wherein the polymer is an alpha olefin homopolymer.

3. The process of claim 1 wherein the sulfonated polymer contains from 0.2 to 0.7 wt. percent sulfur.

4. The process of claim 1 wherein the polymer is polypropylene.

5. The process of claim 1 wherein the polymer is a propylene-styrene copolymer.

6. The process of claim 1 wherein the polymer is a blend of an alpha olefin homopolymer and a styrene polymer.

References Cited by the Examiner

UNITED STATES PATENTS

| | | | |
|---|---|---|---|
| 2,430,569 | 11/47 | Hull | 260—461 |
| 2,691,644 | 10/54 | Roth | 260—79.3 |
| 2,694,086 | 11/54 | Mitchell | 260—686 |
| 2,821,522 | 1/58 | Bauman | 260—79.3 |
| 2,981,720 | 4/61 | Orthner | 260—79.3 |
| 3,072,618 | 1/63 | Turbak | 260—79.3 |

FOREIGN PATENTS 584,249  10/58  Italy.

WILLIAM H. SHORT, *Primary Examiner.*

HAROLD N. BURNSTEIN, *Examiner.*